US009007014B2

(12) United States Patent
Bazzi et al.

(10) Patent No.: US 9,007,014 B2
(45) Date of Patent: Apr. 14, 2015

(54) SYSTEM AND METHOD FOR COMPENSATING FOR HIGH FREQUENCY APPLICATION OF RIPPLE CORRELATION TO MINIMIZE POWER LOSSES IN INDUCTION MACHINES

(71) Applicant: The Board of Trustees of the University of Illinois, Urbana, IL (US)

(72) Inventors: Ali M. Bazzi, Vernon, CT (US); Philip T. Krein, Champaign, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 21 days.

(21) Appl. No.: 13/837,003

(22) Filed: Mar. 15, 2013

(65) Prior Publication Data

US 2014/0184135 A1 Jul. 3, 2014

Related U.S. Application Data

(60) Provisional application No. 61/716,248, filed on Oct. 19, 2012.

(51) Int. Cl.
*H02P 21/14* (2006.01)
*H02P 23/14* (2006.01)

(52) U.S. Cl.
CPC ..................................... *H02P 23/14* (2013.01)

(58) Field of Classification Search
CPC ........ H02P 21/06; H02P 21/146; H02P 21/05
USPC ..................... 318/727, 729, 438, 807, 400.15
See application file for complete search history.

(56) References Cited

U.S. PATENT DOCUMENTS

| | | | | |
|---|---|---|---|---|
| 4,306,182 A * | 12/1981 | Curtiss | ........................ | 318/811 |
| 4,450,398 A * | 5/1984 | Bose | ............................. | 318/803 |
| 5,272,429 A * | 12/1993 | Lipo et al. | ..................... | 318/808 |
| 5,334,923 A * | 8/1994 | Lorenz et al. | ................. | 318/805 |
| 5,450,398 A * | 9/1995 | Abefelt et al. | ................ | 370/352 |
| 5,510,689 A * | 4/1996 | Lipo et al. | ..................... | 318/809 |
| 7,960,928 B2 * | 6/2011 | Tang | ........................ | 318/400.09 |
| 8,102,140 B2 * | 1/2012 | Gao et al. | ...................... | 318/727 |
| 2014/0232307 A1 * | 8/2014 | Yokozutsumi et al. | .. | 318/400.02 |

* cited by examiner

*Primary Examiner* — Rita Leykin
(74) *Attorney, Agent, or Firm* — Klintworth & Rozenblat IP LLC (57) ABSTRACT

A method for minimizing power losses in an alternating current (AC) machine is provided. The method includes determining a first rotor flux signal based on signals of voltage and current inputs to the AC machine, and extracting a ripple component of the rotor flux signal. The method further includes determining a power compensating value that corresponds to a stored energy value of the AC machine, determining a second rotor flux signal that serves to minimize power losses, and providing the second rotor flux signal to a power inverting unit that adjust accordingly the voltage and current input signals provided to the AC machine.

21 Claims, 11 Drawing Sheets

SYSTEM AND METHOD FOR COMPENSATING FOR HIGH FREQUENCY APPLICATION OF RIPPLE CORRELATION TO MINIMIZE POWER LOSSES IN INDUCTION MACHINES

CROSS-REFERENCE TO RELATED APPLICATIONS

The present application claims priority under 35 U.S.C. §119(e) to U.S. Provisional Patent Application Ser. No. 61/716,248, filed Oct. 19, 2012, which is incorporated herein by reference in its entirety.

BACKGROUND

Unless otherwise indicated herein, the materials described in this section are not prior art to the claims in this application and are not admitted to be prior art by inclusion in this section.

About two-thirds of all global electrical power is delivered to electric machines. It has been suggested that global electrical power consumption could be reduced by five (5) percent (%) or more through the use of power loss minimization technology.

The dominant form of an electrical machine is an alternating current (AC) induction machine, representing perhaps 90% of all energy consumption in these electric machines. Many such machines operate at loads well below their rated level, or are otherwise used in a less-than-optimum context. In emerging applications, notably electric vehicles, a motor load is highly variable and rapidly changing.

Conventional optimization techniques, which have been applied to minimize losses in AC induction machines, depend on motor parameters that are usually unknown, have limited accuracy, or are too slow to adjust for minimum power loss with time-varying loads.

Therefore, there exists a need for a method and system that can actively adjust an induction machine operation in order to minimize power losses and therefore maximize the efficiency of the induction machine in any operating conditions.

SUMMARY

Disclosed herein are improved methods and systems for compensating for high frequency application of ripple correlation control (RCC) to minimize power losses in induction machines.

In one embodiment, a method for minimizing power losses in an alternating current (AC) machine includes determining a first rotor flux signal based on signals of voltage and current inputs to the AC machine, and extracting ripple components of the rotor flux signal. The method further includes estimating a power compensating value that corresponds to a stored energy value of the AC machine, determining a second rotor flux signal that serves to minimize power losses, and providing the second rotor flux signal to a power inverting unit that adjust accordingly the voltage and current input signals provided to the AC machine.

In one aspect, a system for minimizing power losses in an alternating current (AC) machine includes a rotor-flux estimating unit configured to derive a first rotor flux signal based on signals of voltage and current inputs to the AC machine, a ripple extracting unit for extracting a ripple component of the first rotor flux signal, and a power compensating unit for determining a power compensating value that corresponds to a stored energy value of the AC machine based on the extracted ripple component. The system further includes a ripple correlation unit for determining a second rotor flux signal based on the determined power compensating value, wherein the second rotor flux signal serves to minimize power losses of the AC machine, and a power inverting unit configured to adjust the voltage and current input signals provided to the AC machine based on the second rotor flux signal.

In another aspect, a computing system includes one or more computers and one or more storage devices storing instructions that are operable, when executed by the one or more computers, to cause the one or more computers to perform the method for minimizing power losses in an alternating current (AC) machine.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the disclosure by way of example only and not by way of limitation.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

As stated above, conventional optimization techniques applied to minimize losses in AC induction machines have limited accuracy and are slow to adjust for minimum power loss with time-varying loads. One of these real-time optimization techniques involves a ripple correlation control (RCC) whose main advantage is the utilization of inherent ripple in a dynamic system to find an optimum without any external perturbation. For example, an inverter-driven AC induction machine has a ripple flux component due to the inherent switching of the driving inverter. This ripple flux component produces variations in the input power.

Figure 1:
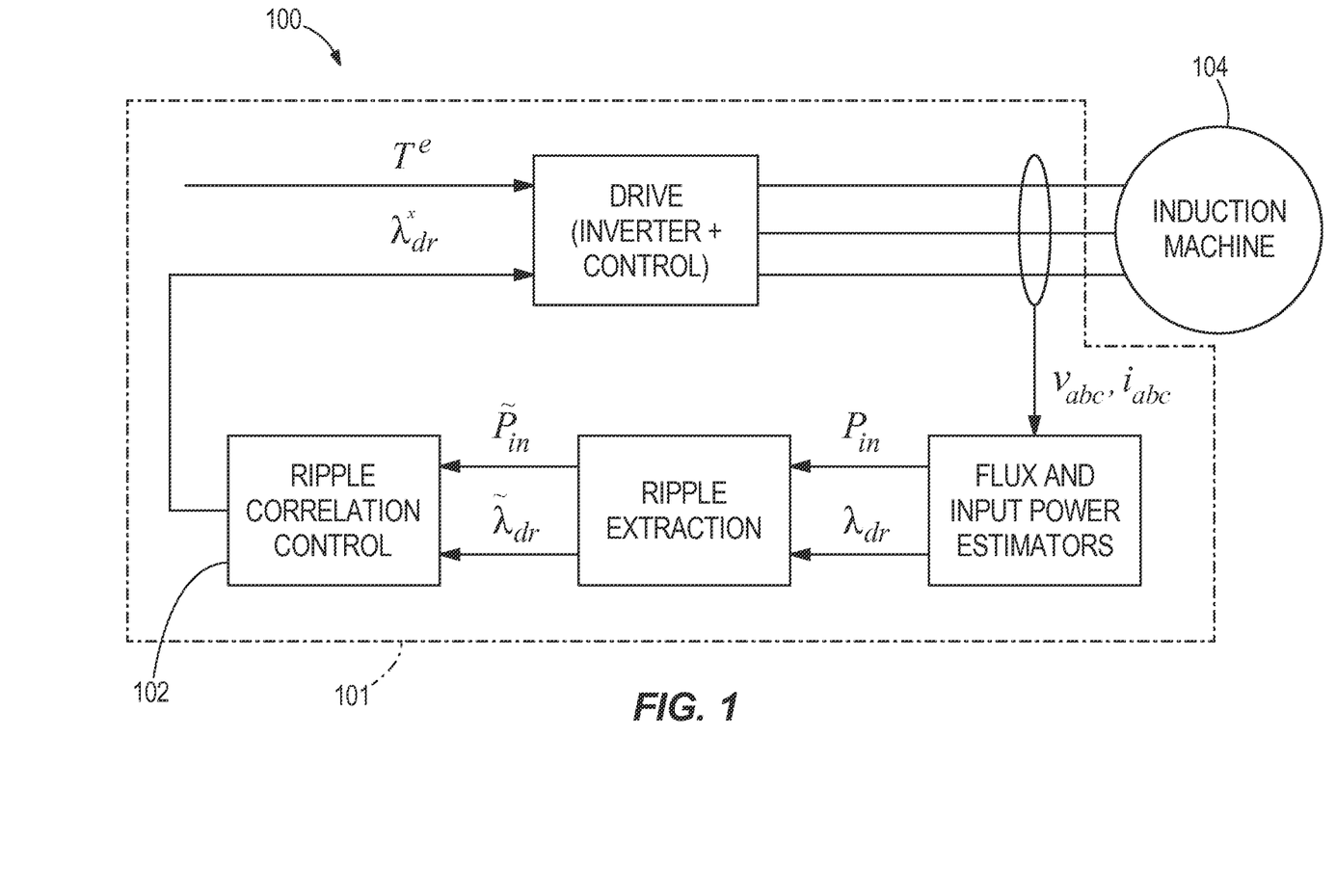
FIG. 1 is a schematic block diagram of an embodiment of a conventional system for applying RCC to AC induction machine.

A major problem when applying RCC to loss minimization of AC induction machines is that it requires very low ripple frequencies (slow ripple), which are not inherently available in the machine's inverter drive. A few RCC approaches concluded that a low frequency ripple is needed for RCC to function appropriately with induction machines. The required ripple is not inherently available in an AC induction machine drive, unless running at an extremely low speed close to stall where the electrical frequency is close to zero. One such RCC approach is implemented by a conventional system 101 shown in FIG. 1. However, system 101, which is configured to utilize an RCC unit 102 with an induction machine 104 controlled by a field-oriented control (FOC) (not shown), still requires low frequency ripple injection for RCC to converge to a minimum power loss operating condition.

2. System for Compensating for High Frequency Application of Ripple Correlation Control to Minimize Power Losses in Induction Machines In one exemplary embodiment, to minimize power losses of an AC induction machines without a low frequency injection, a power compensating unit can be added to a system that drives the induction machine so as to utilize RCC at high frequencies. As discussed hereafter, this addition of the power compensating unit has proven in experimentations to be essential when applying RCC to induction machines or other real-time optimization applications that require low-frequency ripple due to energy storage. The power compensating unit is configured to compensate for energy storage in the AC induction machine which leads to the low frequency range of feasible ripple.

Figure 2:
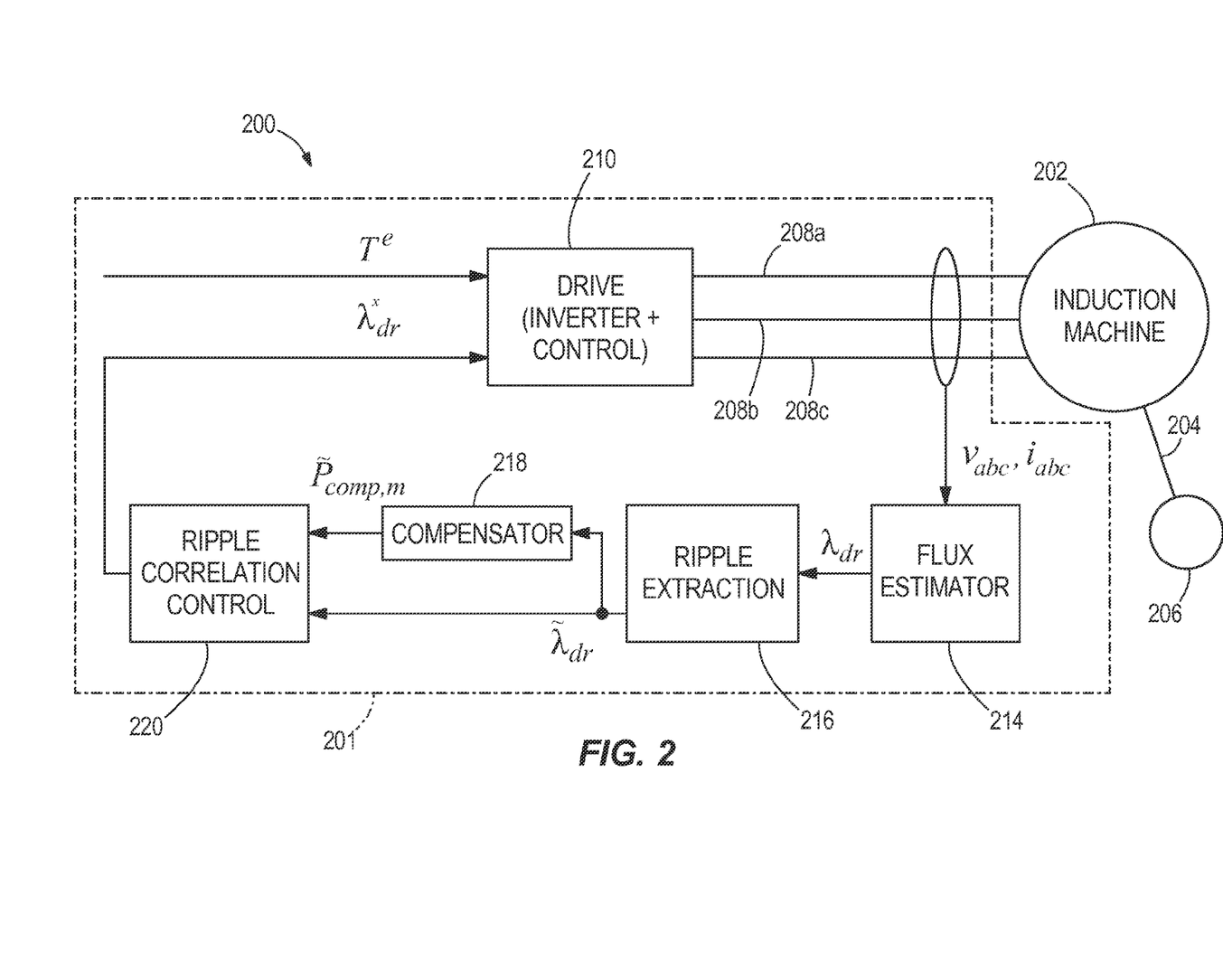
FIG. 2 is a schematic block diagram of an example embodiment of a system for compensating for high frequency application of ripple correlation to minimize power losses in induction machines.

Now referring to FIG. 2, an example embodiment 200 of a computing system 201 that does not require low frequency ripple injection is shown. Computing system 201, which is configured to compensate for high frequency application of ripple correlation control (RCC) to minimize power losses in an AC machine, is coupled to an AC machine 202, which is in turn coupled by a shaft 204 to a load 206. AC machine 202 is provided with a balanced polyphase (three-phase as shown) power through supply lines 208a, 208b, and 208c from a three-phase inverter and control system 210, which can be constructed/configured in various ways, depending on the requirements for AC machine 202, which can be one of various types of induction machines. A control unit (not shown) associated with or integral to inverter system 210 is configured to receive command signals from a field oriented control (FOC) unit (not shown) that may be integral to inverter system 210. The command signals include an electromechanical signal $T^e$ and an optimum rotor flux $\lambda_{dr}^*$, which will discussed in detail hereafter. In one embodiment, inverter system 210 provides power for driving AC machine 202 at a desired fundamental drive frequency, which may vary from low frequencies to running frequencies, which are typically in the range of 60 Hz but may also extend up to higher or lower frequencies as needed.

Still referring to FIG. 2, computing system 201 further includes a rotor flux estimating unit 214 that is coupled to a set of voltage and current sensors (not shown) associated with power lines 208a, 208b, and 208c that detect or sense voltage signals $V_{abc}$ at the inputs to AC machine 202 and current signals $I_{abc}$ flowing in lines 208a, 208b, and 208c. As known to one of ordinary skill in the art, the current sensors may be Hall Effect sensors, current transformers, or any other suitable current sensors. Rotor flux estimating unit 214 is configured to transform voltage and current signals $V_{abc}$ and $I_{abc}$ into equivalent q-axis and d-axis stator current and voltage signals $I_{qd,s}$ and $V_{qd,s}$, respectively. Rotor flux estimating unit 214, which includes a rotor-flux derivation unit (not shown), may be a back-electromagnetic force (back-EMF) estimating unit that is configured to estimate rotor flux linkage $\lambda_{dr}$, as represented by the following equation:

$$\lambda_{dr} = \frac{L_r}{L_m}(\lambda_{qds} - \sigma L_s I_{qds}) \qquad \text{Equation 1}$$

where $\lambda_{qd}^s = \int (V_{qd}^s - R_s I_{qd}^s) \, dt$, and where $L_m$, $L_r$, and $L_s$ represent magnetizing, rotor, and stator inductances, respectively, and σ represents a leakage factor of AC machine 202. Rotor flux estimating unit 214 is further configured to provide estimates of rotor flux linkage signal $\lambda_{dr}$ to a ripple extraction unit 216.

In accordance with an exemplary embodiment, ripple extraction unit 216 is configured to extract a ripple component $\tilde{\lambda}_{dr}$ of rotor flux linkage signal $\lambda_{dr}$. The ripple component $\tilde{\lambda}_{dr}$ is then provided to a power compensating unit 218 and to an RCC unit 220. In accordance with one embodiment, based on ripple component $\tilde{\lambda}_{dr}$, power compensating unit 218 is configured to generate and provide a power compensation signal to an RCC process running in RCC unit 220. The provided power compensation signal includes a power compensation $\tilde{P}_{comp,m}$ that takes into consideration energy stored in AC induction machine 202, and enables a generation of an improved estimate of ripple and phase relations and enables an improved and more accurate convergence to a minimum power loss. This power compensation is configured as a correction of ripple component $\tilde{\lambda}_{dr}$.

As known to one of ordinary skill in the art, a minimization process typically involves minimizing a cost function of an associated system. In this power minimization process, the cost function represents a power loss ($P_{loss}$), and a control variable is the d-axis rotor flux in the synchronous frame $\lambda_{dr}$. When maintaining a constant output power $P_{out}$, a minimization of $P_{loss}$ is equivalent to minimizing an input power $P_{in}$ since $P_{loss} = P_{in} - P_{out}$.

Figure 3:
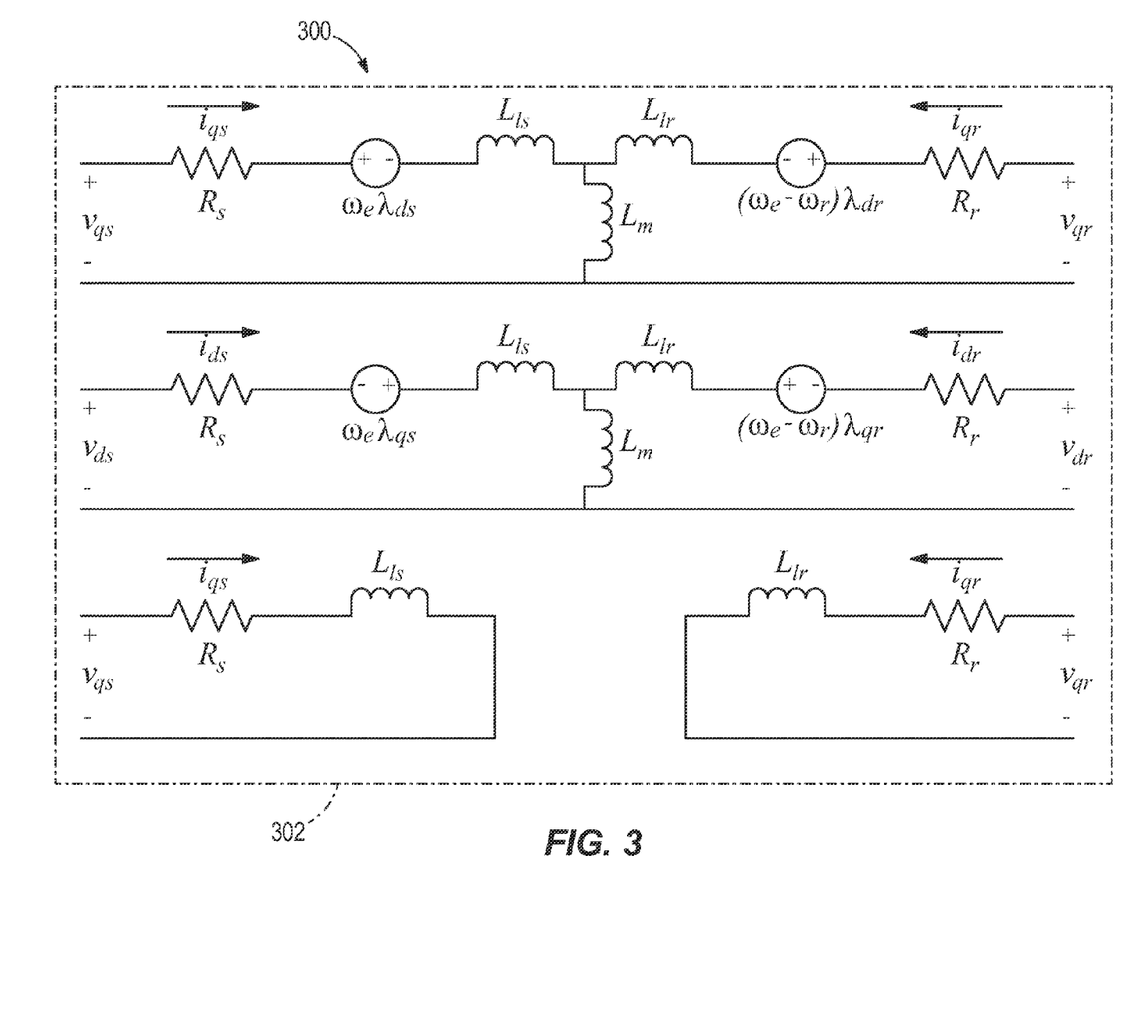
FIG. 3 is a schematic diagram illustrating circuitry of an induction machine qd0 model.

Now referring to FIG. 3, an embodiment 300 of an induction machine model 302 in a d-q synchronous frame is shown. As known to one of ordinary skill in the art, based on FIG. 3, induction machine model 302 operating under FOC, can be represented by the following equations for input power $P_{in}$ and for d-q voltages $v_{qs}$, $v_{ds}$, $v_{qr}$, and $v_{dr}$:

$$P_{in} = 3/2(v_{qs}i_{qs} + v_{ds}i_{ds} + v_{0s}i_{0s})$$ Equation 2

$$v_{qs} = R_s i_{qs} + w_e \lambda_{ds} + s\lambda_{qs}$$ Equation 3

$$v_{ds} = R_s i_{ds} - w_e \lambda_{qs} + s\lambda_{ds}$$ Equation 4

$$v_{qr} = R_r i_{qr} + (w_e - w_r)\lambda_{dr} + s\lambda_{qr}$$ Equation 5

$$v_{dr} = R_r i_{dr} - (w_e - w_r)\lambda_{qr} + s\lambda_{dr}$$ Equation 6 which yields the following matrix equations for currents $i_{qs}$, $i_{ds}$, $i_{qr}$, and $i_{dr}$:

$$\begin{bmatrix} i_{qs} \\ i_{ds} \\ i_{qr} \\ i_{dr} \end{bmatrix} = \begin{bmatrix} L_{ls} + L_m & 0 & L_m & 0 \\ 0 & L_{ls} + L_m & 0 & L_m \\ L_m & 0 & L_{lr} + L_m & 0 \\ 0 & L_m & 0 & L_{lr} + L_m \end{bmatrix}^{-1} \begin{bmatrix} \lambda_{qs} \\ \lambda_{ds} \\ \lambda_{qr} \\ \lambda_{dr} \end{bmatrix}$$ Equation 7

$$i_{qs} = \frac{4}{3} \frac{(L_{lr} + L_m) T^e}{P L_m \lambda_{dr}}$$ Equation 8

$$i_{ds} = \frac{4}{3} \frac{\lambda_{dr}}{L_m}$$ Equation 9

$$i_{qr} = \frac{L_m}{(L_m + L_{lr})}$$ Equation 10

$$\lambda_{qs} = (L_{ls} + L_m)i_{qs} + L_m i_{qr}$$ Equation 11

$$\lambda_{ds} = (L_{ls} + L_m)i_{qs}$$ Equation 12

$$i_{dr} = \lambda_{qr} = 0$$ Equation 13

Based on the above equations 2-13, a transfer function of any perturbations in input power $P_{in}$ owing to changes in rotor flux can be expressed by the following equation:

$$\frac{\partial P_{in}}{\partial \lambda_{dr}} = \frac{3L_m}{2D^2} \frac{[S(\lambda_{ds}D) + 2L_m\lambda_{dr}R_s - }{2(L_{mlr} + L_m)R_s\lambda_{ds} - Dw_e\lambda_{qs}]}$$ Equation 14 which is derived from $P_{in}$ under balanced three-phase conditions, but without or minimal core losses. In addition to the elements corresponding to physical and electromagnetic parts of AC induction machine 202, Equation 8 includes constant gain D. Moreover, $\lambda_{dr}$ can be varied and the frequency response and Bode plots of input power $P_{in}$ can be generated.

In Equation 14, one of the variables is $w_e$, which represents a stator input operating radian frequency. In order to evaluate $w_e$, a measurement or an estimate of rotor speed $w_m$ of AC induction machine 202 is needed, which enables a determination of a rotor electrical speed $w_r$, as shown in Equation 15. Further, with an estimate of a slip frequency $w_{slip}$, $w_e$ can be determined using Equation 16, as follows:

$$w_r = \frac{P}{2} w_m$$ Equation 15

$$w_e = w_r + w_{slip} = w_r + \frac{i_{qs}}{i_{ds}} \frac{R_r}{(L_{lr} + L_m)}$$ Equation 16

In one embodiment, the variables of Equations 15 and 16 are selected around an operating point at which the induction machine model is linearized. The values of these variables determined using Equations 2-13 are substituted in Equation 14. The rotor flux $\lambda_{dr}$ can be varied and the frequency response and Bode plots of input power from Equation 14 can be generated. At the optimal value of $\lambda_{dr}$, given by $\lambda_{dr}^*$, the phase of Equation 14 can be expected to be at 180 n+90°, where n is a natural number (i.e., n∈ℕ).

Figure 4A:
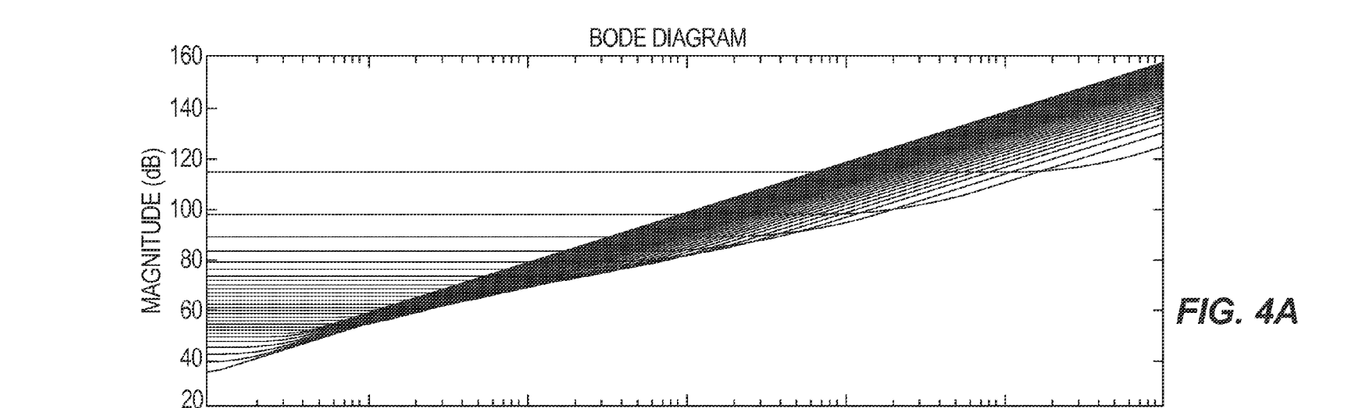
FIGS. 4A-B are two graphs that illustrate Bode diagrams of an input power for different values of rotor flux linkage $\lambda_{dr}$.
Figure 4B:
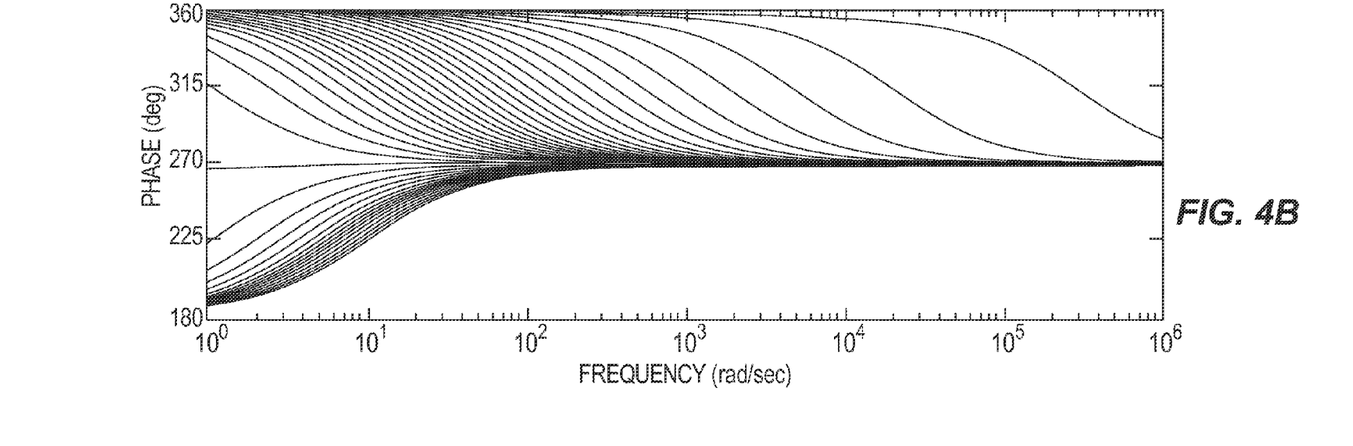
Figure 5:
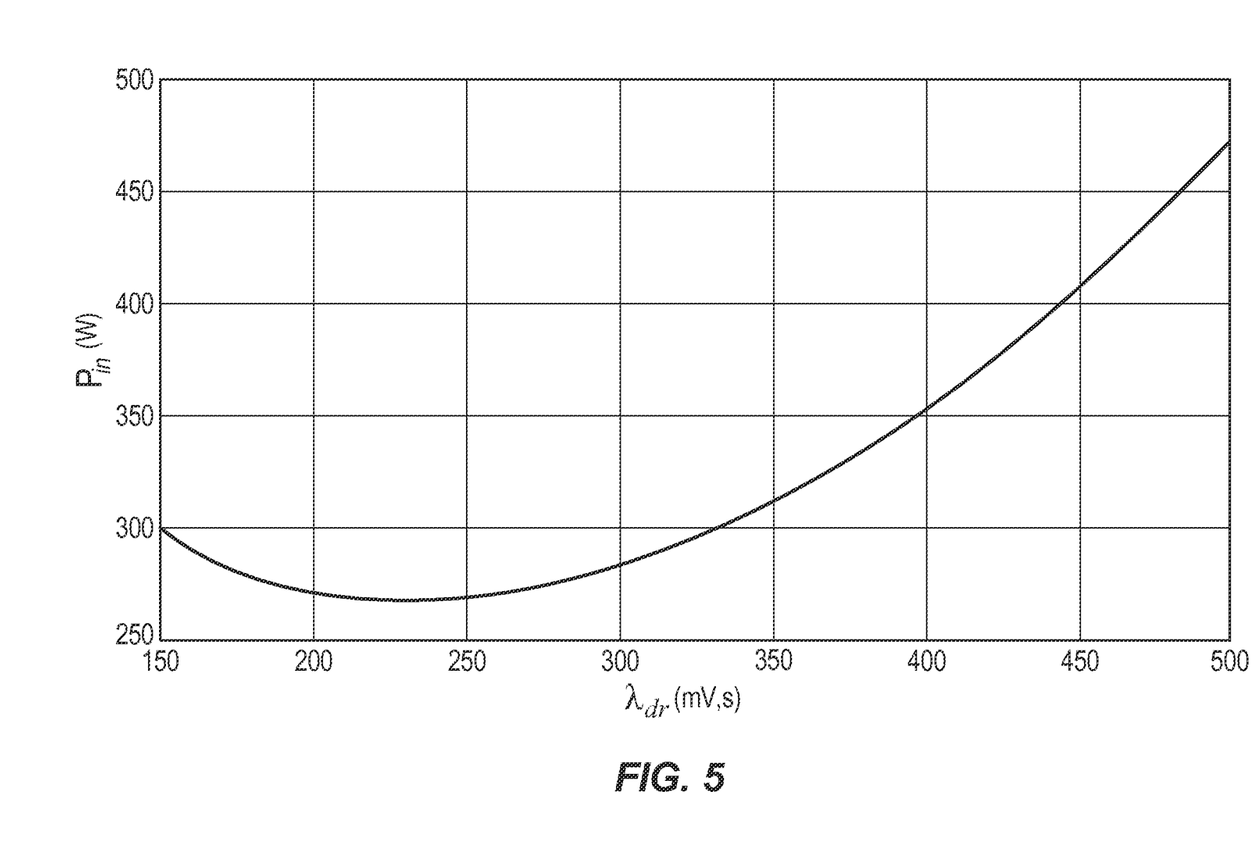
FIG. 5 is a graph illustrating a signal waveform of an input power over a range of values of rotor flux linkage $\lambda_{dr}$.

As known to one of ordinary skill in the art, an optimum moves around in real-time operation since AC induction machine 202 can never be in steady state under variable loads and disturbances, and since core losses are not accounted for. Even so, linearization is essential to show that the optimal minimum $P_{in}$ is attained and corresponds to a specific phase relationship. As an example, an operating point is selected at 2 Nm (Newton Meter) for a fan load. The resulting Bode plots of Equation 14 for different values of rotor flux $\lambda_{dr}$ are shown in FIGS. 4A-B. The input power is shown over a range of flux values in FIG. 5. As shown in FIG. 5, there is a global optimum that corresponds to a phase of 270° as shown in FIGS. 4A-B. However, as illustrated in FIGS. 4A-B a frequency at which this global optimum can be identified unambiguously is not much more than 100 rad/sec or 15.92 Hz. The phase in FIGS. 4A-B is not exactly 270° at zero frequency due to the limited precision of the $\lambda_{dr}$ steps. If the steps can go to infinite precision, an exact minimum can be found at low frequency, and then tracked, since the phase will change if operating conditions move the system away from the optimum point.

In one embodiment, a limited frequency range for applying RCC, as shown in FIGS. 4A-B, is attributable to energy storage in the induction machine. In this induction machine case, a combination of the leakage and magnetizing inductances are a storage media. To extend an operating frequency range, a power compensation may be figured out for the stored energy. As known to one of ordinary skill in the art, given an inductor (induction element) L carrying a time varying current i(t) with a voltage drop v(t), an energy stored in the inductor L is as follows:

$$E(t) = \frac{1}{2} Li(t)^2$$ Equation 17

Since Equation 14 is expressed in term of power rather than energy, and since it is in the frequency domain, a power expression from Equation 17 in the frequency domain would account for the energy storage problem and can be augmented into Equation 14. As such, the power in the inductor L is given by:

$$P(t) = \frac{dE(t)}{dt} = V_L(t)i(t) = L\frac{di(t)}{dt}i(t)$$ Equation 18

Determining a Laplace transform of Equation 18 may be a complicated process by direct application of the Laplace transformation. However, for an initial current i(0)=0 at t=0, we have:

$$\mathscr{L}\left(\frac{dE(t)}{dt}\right) = S\left(\frac{1}{2}Li(t)^2\right) - \frac{1}{2}Li(0)^2 = S\left(\frac{1}{2}Li(t)^2\right)$$ Equation 19

Taking an inverse Laplace transform yields:

$$\mathscr{L}^{-1}=\left(S\left(\frac{1}{2}Li(t)^2\right)\right)=\frac{1}{2}L\frac{di(t)^2}{dt}=\frac{2}{2}L\frac{di(t)}{dt}i(t)=L\frac{di(t)}{dt}i(t) \quad \text{Equation 20}$$

As the results of Equations 18 and 20 match, then:

$$\mathscr{L}P(t)=S\left(\frac{1}{2}Li(t)^2\right) \quad \text{Equation 21}$$

Further, for the inductances of FIG. 3, an inductance power (stored energy) can be expressed as follows:

$$P_{ind}=s\left[\frac{1}{2}L_m(i_{qs}^2+i_{qr}^2)+\frac{1}{2}L_m(i_{ds}^2+i_{dr}^2)+\frac{1}{2}L_{ls}(i_{qs}^2+i_{ds}^2)+\frac{1}{2}L_{lr}(i_{qs}^2+i_{ds}^2)\right] \quad \text{Equation 22}$$

Figure 6A:
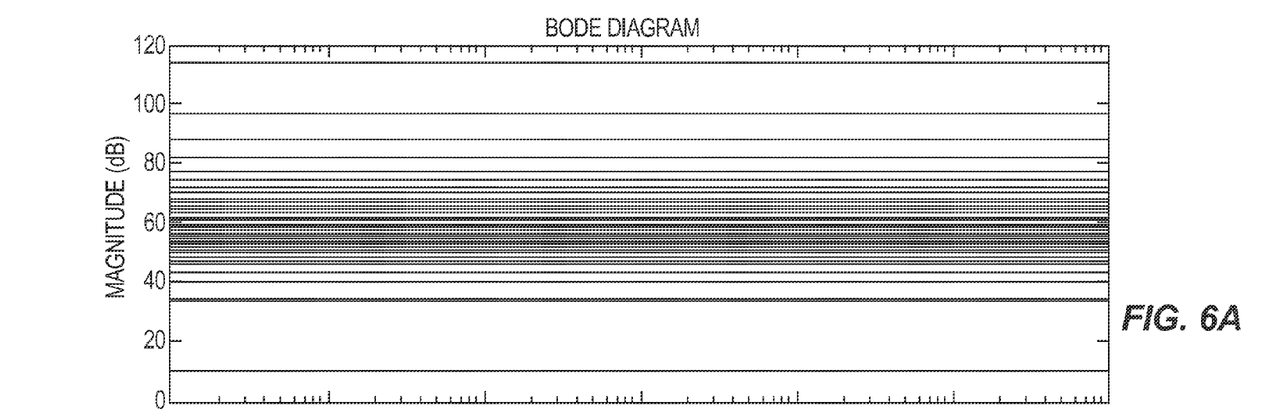
FIGS. 6A-B are two graphs illustrating Bode diagrams of an input power associated with an ideal power compensation.
Figure 6B:
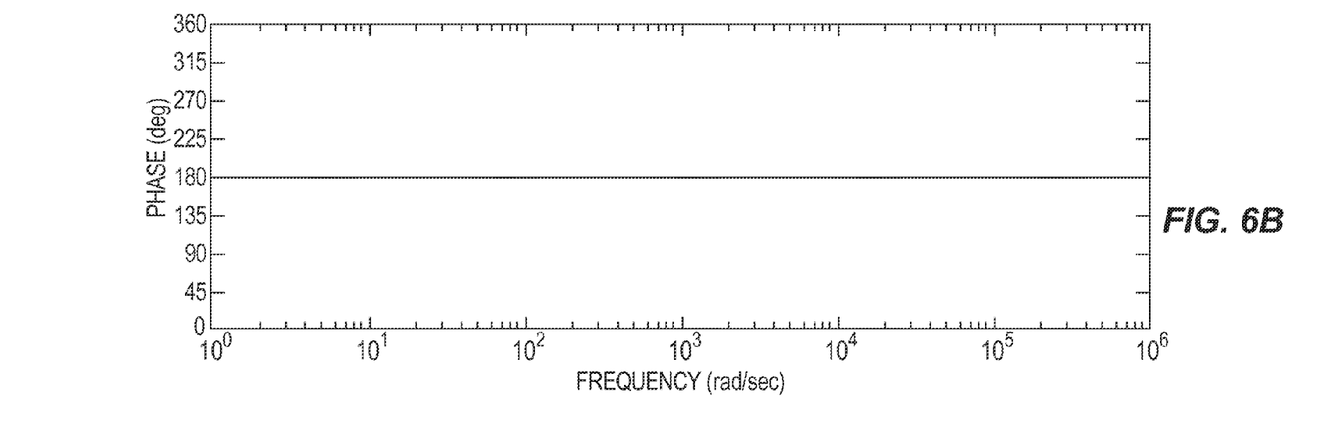

One reason why $(i_{qs}^2+i_{qr}^2)$ and $(i_{ds}^2+i_{dr}^2)$ are used in Equation 22 rather than $(i_{qs}+i_{qr})^2$ and $(i_{ds}+i_{dr})^2$ is that the latter two have no significant compensation effect and they reintroduce the same storage problem since the $2i_{qs}i_{qr}$ and $2i_{ds}i_{dr}$ would not be cancelled. Physically, the rotor and stator terms do not add in $L_m$ in either d or q circuits as might be interpreted in the model of FIG. 3, and therefore the cross terms $2i_{qs}i_{qr}$ and $2i_{ds}i_{dr}$ should not be considered. The compensated input power is thus as follows:

$$P_{comp,all}=P_{in}-P_{ind} \quad \text{Equation 23}$$

$$\frac{\partial P_{comp,all}}{\partial \lambda_{dr}}=\frac{3}{2}\frac{1}{D^2}[S(A\lambda_{dr}+B\lambda_{ds})+2\lambda_{dr}L_m^2R_s-2L_m(L_{lr}+L_m)R_s\lambda_{ds}+DL_mw_e\lambda_{dr}] \quad \text{Equation 24}$$

where $A=-(L_{ls}+L_m)(L_{lr}(L_{ls}+L_m)+L_m(L_{ls}+2L_m))$ and $B=(L_m)(L_{lr}(L_{ls}+L_m)+L_m(L_{ls}+2L_m))$ Bode plots associated with Equation 24 are shown in FIGS. 6A-B. The frequency range of the compensated transfer function goes to infinity ($\infty$). The 270° shift is not shown in FIGS. 6A-B, since the precision of $\lambda_{dr}$ is really finite compared to an ideal result. Phase shifts of 180° and 360° below and above the optimum, respectively, are clear. Thus, the optimal $\lambda_{dr}*$ did not change, but the frequency range has been extended.

The "compensation" procedure has so far been discussed above as a mathematical determination. In a practical operation, a compensation for leakage inductances can be a hard task especially since these inductances are in the range of 1% to 5% of the magnetizing inductance and can be hard to measure. Therefore, in accordance with an exemplary embodiment, an alternate compensation method with less dependence on induction machine parameters is provided herein. Since most of the stored energy is attributable to $L_m$, an effective compensated input power is considered as follows:

$$P_{comp,m}=P_{in}-P_m \quad \text{Equation 25}$$

$$\text{where } P_m=s\left[\frac{1}{2}L_m(i_{qs}^2+i_{qr}^2)+\frac{1}{2}L_m(i_{ds}^2+i_{dr}^2)\right] \quad \text{Equation 26}$$

Here, $L_m$ is a value estimated from basic machine data. In this embodiment, the effect of rotor flux variation is identified by the following equation:

$$\frac{\partial P_{comp,all}}{\partial \lambda_{dr}}=\frac{3}{2}\frac{L_m^2}{D^2}[sL_m(X\lambda_{dr}+Y\lambda_{ds})+L_m(2\lambda_{dr}L_mR_s-2(L_{lr}+L_m)R_s\lambda_{ds}+Dw_e\lambda_{dr}] \quad \text{Equation 27}$$

where $X=-(L_{ls}^2+2L_m(L_{ls}+L_m))$ and $Y=-(L_{ls}L_{lr}+2L_m^2)$

Figure 7A:
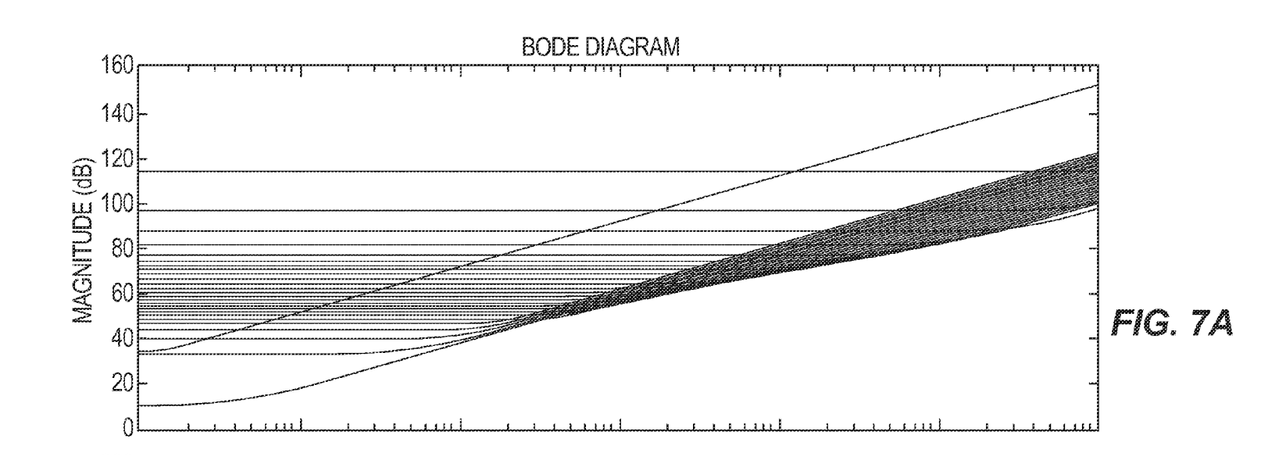
FIGS. 7A-B are two graphs illustrating Bode diagrams of an optimum input power for different values of rotor flux linkage $\lambda_{dr}$.
Figure 7B:
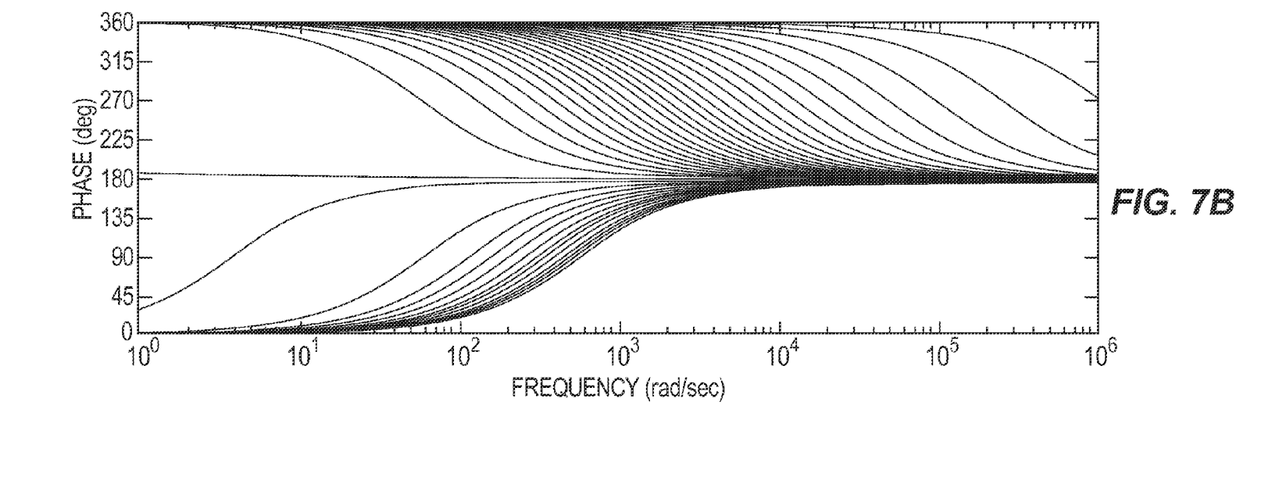

The Bode plots (diagrams) associated with Equation 27 are shown in FIGS. 7A-B and show that the optimum can be identified up to about 3000 rad/sec or 477 Hz. This range covers the 120 Hz ripple in single-phase power sources and 360 Hz from three-phase bridge rectifiers that will be inherent in induction machine drives. Estimates of leakage inductances and more accurate data about $L_m$ can improve this range, and reach switching frequencies in power electronics converters feeding induction machines. The optimal value of $\lambda_{dr}*$ may not change, but the ripple frequency range over which RCC is useful has been extended. It is essential to extend the frequency range to at least 360 Hz to enable a rectifier ripple to be used (implemented). If it can be extended to 10 kHz or more, then an output inverter ripple can be employed for RCC.

3. Example of an Application of a Compensator for Minimizing Power Losses

In order to demonstrate an advantageous effect of power compensating unit 218 on correcting the phase between $\lambda_{dr}$ and $P_{in}$, an simulation example is discussed herein. AC induction machine 202 as used in the experiment has the following parameters:

| Motor Parameters | Test Motor |
| --- | --- |
| Rated power | 1.5 hp |
| Rated speed | 1750 rpm |
| Number of poles (P) | 4 |
| Referred rotor resistance (Rr') | 0.7309 Ω |
| Stator resistance (Rs) | 1.5293 Ω |
| Referred rotor leakage inductance ($L_{lr}$') | 0.005343 H |
| Stator leakage inductance ($L_{ls}$) | 0.00356 H |
| Magnetizing inductance ($L_m$) | 0.19778 H |
| Core Loss ($R_c$) | 505 Ω |
| Inertia (J) | 0.01 Kg · m² |

Substituting these parameters in Equation 14 yields the Equation 14 transfer function for an uncompensated system, while substituting them in Equation 24 yields the transfer function of an ideally-compensated system. In accordance with the disclosure, as less dependence on machine parameters is desired, using Equation 27 provides a compensation scheme independent of the leakage inductances. These three systems include an uncompensated system, an ideal compensation system, and an inductance ($L_m$) compensation system. The results of these parameter substitutions involving these three systems are tabulated below where the function is in the form As+B.

| System | A | B |
|---|---|---|
| No Compensation | −33.93 | 2312 |
| Ideal Compensation | 0 | 1541 |
| $L_m$ Compensation | −0.4002 | 1541 |

For comparison purposes, these three systems were simulated with the input to the transfer function being ($\lambda_{dr}$+sinusoidal ripple), and the output being ($P_{in}$+ripple). A load condition is duplicated for all three system simulations. For the sake of illustration, the value of $\lambda_{dr}$ used is at 500 mVs, which is above the optimum. Ideally, the ripples in $\lambda_{dr}$ and $P_{in}$ should be in phase or 180 degrees out-of-phase for any non-optimal $\lambda_{dr}$. Since only low frequency ripple can be used without compensation, a higher frequency of 360 Hz which is naturally found in a rectifier running off a 60 Hz grid is used here to demonstrate the compensator capabilities. The results are shown in FIGS. 8A-D.

Figure 8A:
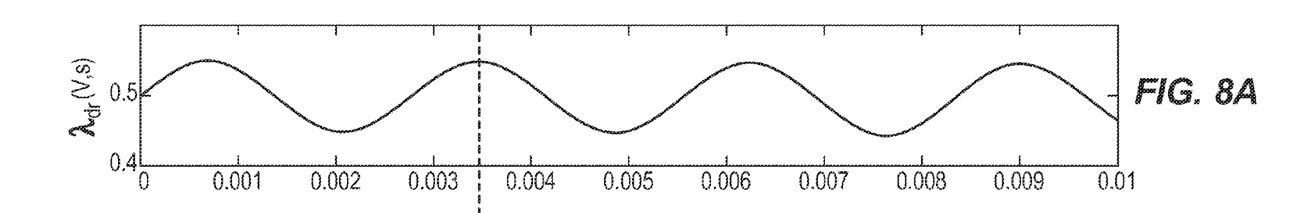
FIGS. 8A-D are four graphs illustrating waveforms of rotor flux linkage signal, uncompensated input power signal, ideal input power signal, and compensated input power signal.
Figure 8B:
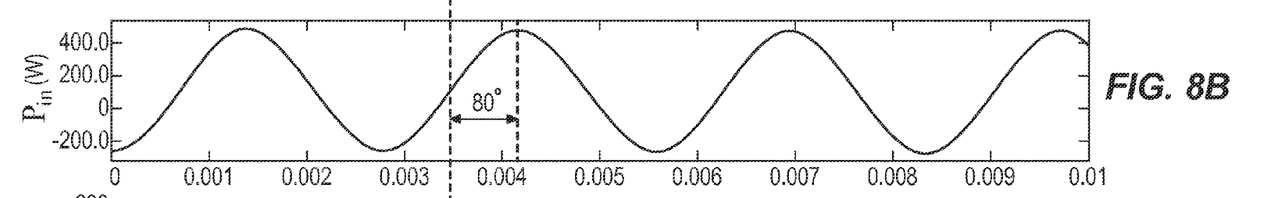
Figure 8C:
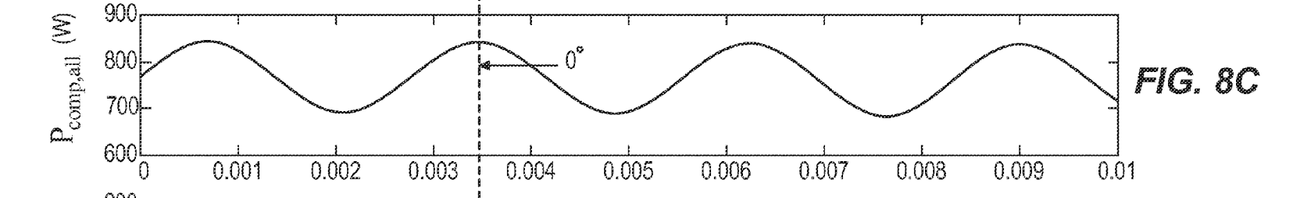
Figure 8D:
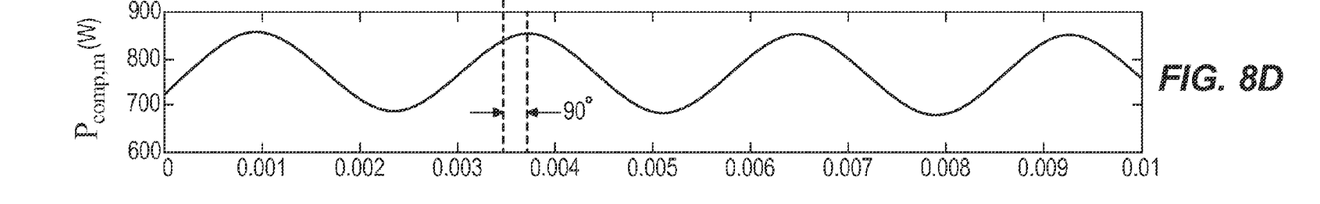

As shown in FIGS. 8A-D, for the simulated uncompensated system, the phase shift between $\lambda_{dr}$ and $P_{in}$ is about 90°, which means that RCC may confuse this non-ideal operating point (above the optimum) with the real optimum and may converge to a suboptimal point. For the ideally compensated system, the phase shift is exactly 0°, which is expected, and which allows RCC to track the optimum at any frequency. Typically, the leakage inductances are not well known, so a power compensating unit considering only $L_m$ was simulated as shown in FIG. 8D. Even though the phase shift under this partial compensation is not exactly zero, it is less than 90°, and RCC will not confuse it with the optimum. Time-domain simulations give a better understanding of the proposed power compensating unit in a real application.

4. Method for Compensating for High Frequency Application of RCC

Figure 9:
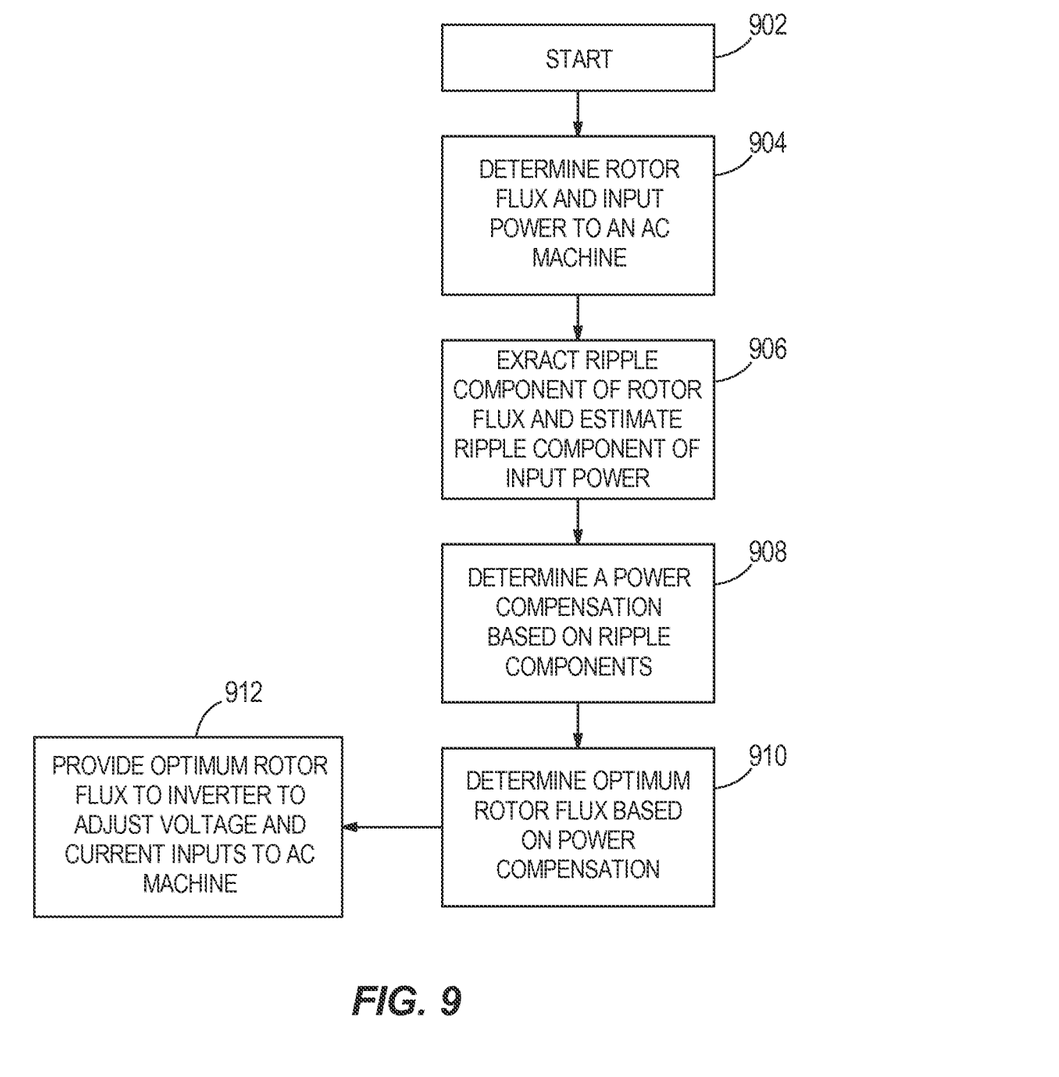
FIG. 9 is a flow chart illustrating an example embodiment of a method for compensating for high frequency application of ripple correlation to minimize power losses in induction machines.

Now referring to FIG. 9, a flow chart 900 illustrating an exemplary embodiment of a method for compensating for high frequency application of RCC to minimize power losses in induction machines is shown. At step 904, computing system 201, via flux and power estimating unit 214, is configured to estimate rotor flux linkage $\lambda_{dr}$ of AC induction machine 202 based on detected machine input voltage and current signals. Subsequently, Ripple extraction unit 216 of computing system 201 extracts the ripple component of rotor flux linkage $\lambda_{dr}$, at step 906. Following this extraction, computing system 201 is configured to determine a power compensation for the induction machine's stored energy in order to extend the operating frequency range, i.e., introducing a high-frequency ripple in $P_{in}$, at step 908. Subsequently, at step 910, RCC unit 218 is configured to determine an optimum rotor flux linkage $\lambda_{dr}$* and provide it to inverter system 210, which in turn is configured to adjust accordingly voltage and current inputs to AC induction machine 202, at step 912.

In accordance with an exemplary embodiment, measured values of voltage and current signals to an AC machine are used to estimate a rotor flux $\lambda_{dr}$, from which a ripple component is extracted. Further, a ripple component of $P_{in}$ is estimated using the proposed compensation approach. The estimated $P_{in}$ ripple component and the extracted $\lambda_{dr}$ ripple component are used with the RCC to generate an optimal flux linkage $\lambda_{dr}$*.

Figure 10:
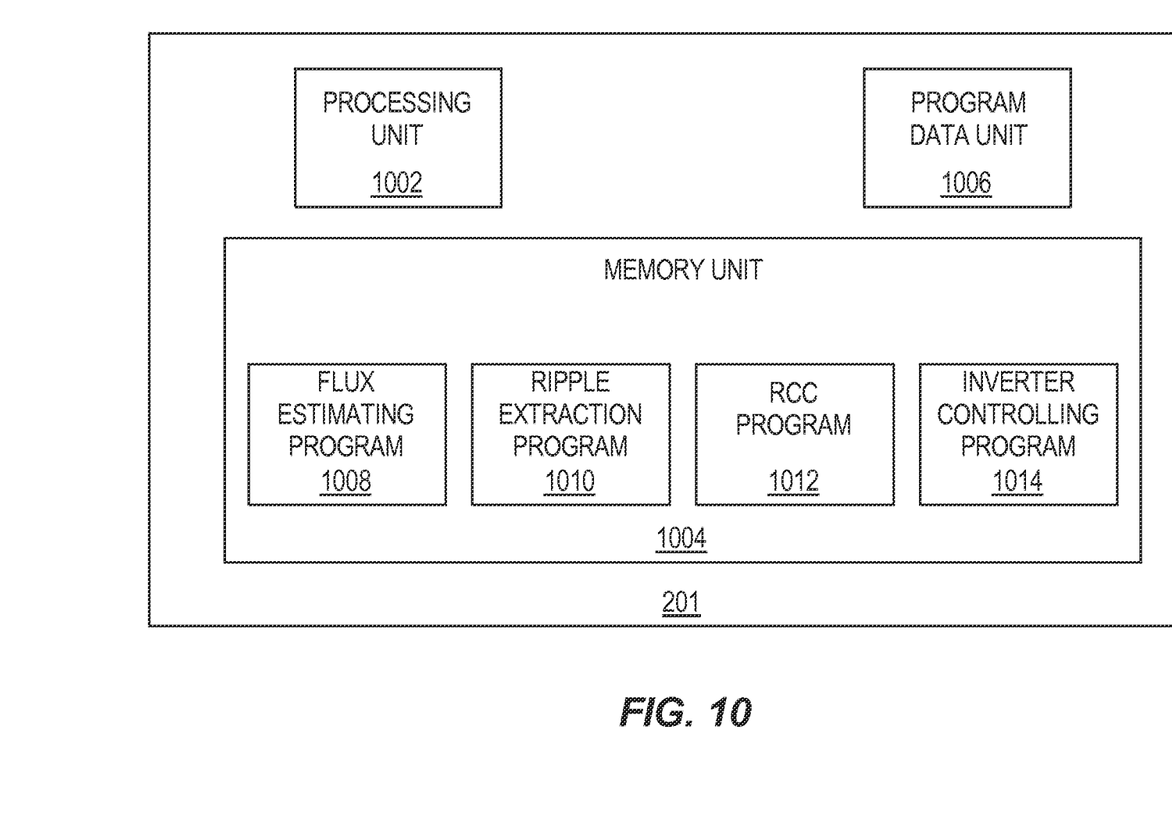
FIG. 10 is a schematic drawing illustrating a computing system according to an exemplary embodiment.

FIG. 10 illustrates a schematic drawing of computing system 201 according to an exemplary embodiment. Computing system 201 includes a processing unit 1002, a memory unit 1004, and a program data unit 1006. Processor unit 1002 is configured to execute instructions and to carry out operations associated with computing system 201. For example, using instructions retrieved from memory unit 1004, processor unit 1002 may control the reception and manipulation of input and output data between components of computing system 201. Processing unit 1002 may include an integrated circuit that can be configured by the user, such as a field-programmable gate array (FPGA). The FPGA configuration is generally specified using a hardware description language (HDL). Processor unit 1002 can be implemented on a single-chip, multiple chips or multiple electrical components. For example, various architectures can be used for processor unit 1002, including dedicated or embedded processor or microprocessor (µP), single purpose processor, controller or a microcontroller (µC), application-specific integrated circuit (ASIC), any combination thereof, and so forth. In most cases, the processor unit together with an operating system operates to execute computer code and produce and use data.

Memory unit 1004 generally provides a place to store computer code and data that are used by computing system 201. Memory unit 1004 may include but not limited to non-volatile memory, such as read-only memory (ROM, flash memory, etc.), volatile memory, such as random-access memory (RAM), a hard disk drive and/or the like. In accordance with one embodiment, memory unit 1004 may include a rotor-flux estimating program or application 1008, a ripple extraction program or application 1010, a power compensating program or application 1012, a ripple correlation controlling program or application 1014, and a inverter controlling program or application 1016.

Figure 11:
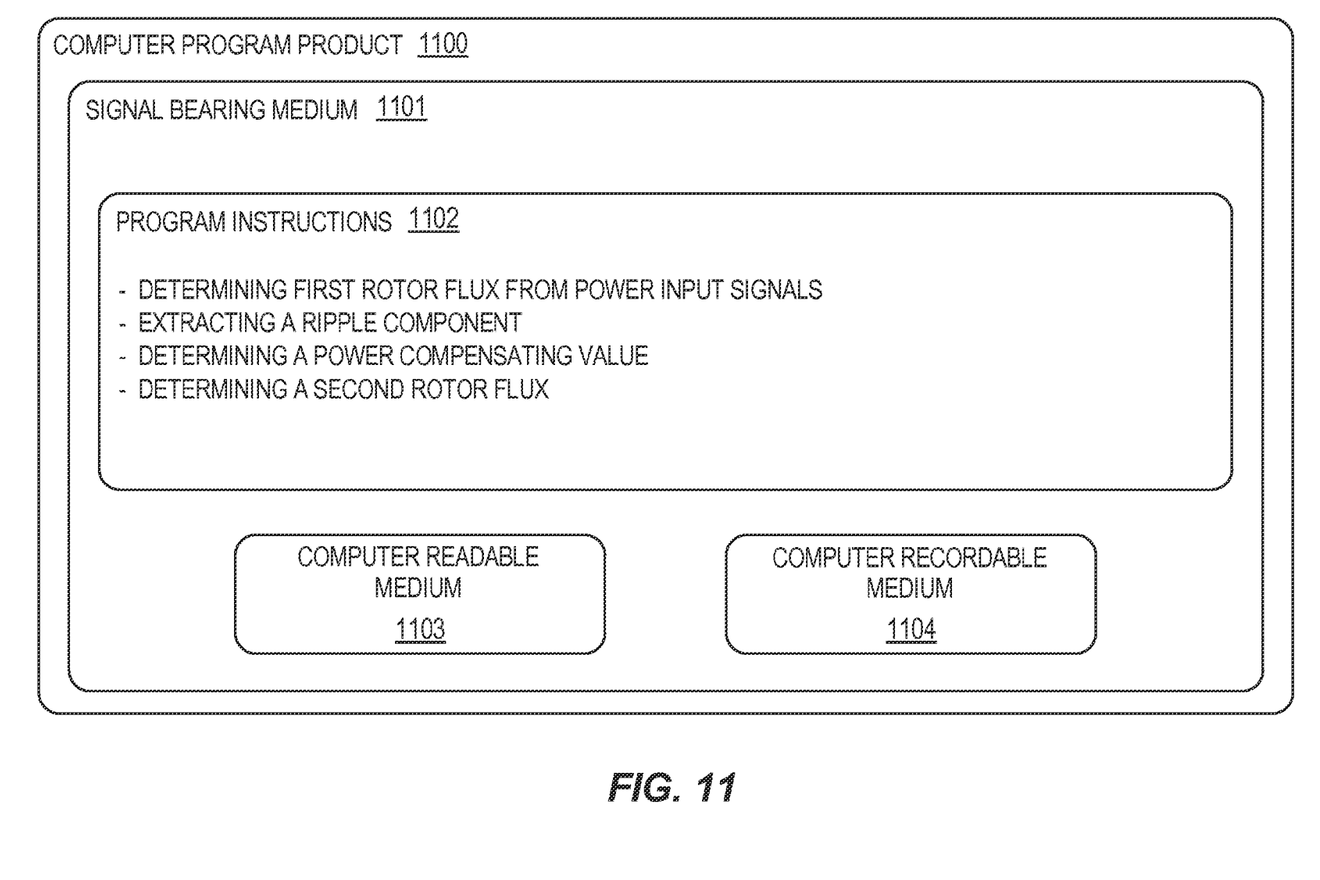
FIG. 11 is a schematic diagram illustrating a conceptual partial view of an example computer program associated with the method of FIG. 9.

In some embodiments, the disclosed method may be implemented as computer program instructions encoded on a non-transitory computer-readable storage media in a machine-readable format. FIG. 11 is a schematic illustrating a conceptual partial view of an example computer program product 1100 that includes a computer program for executing a computer process on a computing device, arranged according to at least some embodiments presented herein. In one embodiment, the example computer program product 1100 is provided using a signal bearing medium 1101. The signal bearing medium 1101 may include one or more programming instructions 1102 that, when executed by one or more processors may provide functionality or portions of the functionality described above with respect to FIG. 9. Thus, for example, referring the embodiment shown in FIG. 9, one or more features of blocks 902, 904, 906, 908, 910, and/or 912 may be undertaken by one or more instructions associated with the signal bearing medium 1101.

In some examples, the signal bearing medium 1101 may encompass a non-transitory computer-readable medium 1103, such as, but not limited to, a hard disk drive, a Compact Disc (CD), a Digital Video Disk (DVD), a digital tape, memory, etc. In some implementations, the signal bearing medium 1001 may encompass a computer recordable medium 1104, such as, but not limited to, memory, read/write (R/W) CDs, R/W DVDs, etc.

Alternatively, the above-described method may be implemented using analog circuitry. As such, an implementation of a step of method includes but is not limited to hardware, firmware, and/or combinations of each to perform a function (s) or an action(s), and/or to cause a function or action from another step of the method. Further, each step of the method may require an operable connection or a connection by which components of system 101 are "operably connected", in which signals, physical communications, and/or logical communications may be sent and/or received. An operable connection may include a physical interface and/or an analog electrical interface. An operable connection may include differing combinations of interfaces and/or connections sufficient to allow operable control. For example, two analog components can be operably connected to communicate signals to each other directly or through one or more intermediate analog components.

In addition, a signal, as used herein, includes but is not limited to, electrical signals, optical signals, analog signals, digital signals, data, computer instructions, processor instructions, messages, a bit, a bit stream, or other means that can be received, transmitted and/or detected.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method for minimizing power losses in an alternating current (AC) machine, comprising:
    determining a first rotor flux signal based on voltage and current input signals to the AC machine;
    determining a ripple component of the first rotor flux signal;
    determining a power compensating value that corresponds to a stored energy value of the AC machine based on the ripple component;
    determining a second rotor flux signal based on the determined power compensating value, wherein the second rotor flux signal serves to minimize power losses of the AC machine; and
    providing the second rotor flux signal to a power inverting unit configured to adjust the voltage and current input signals provided to the AC machine.

2. The method of claim 1, wherein the second rotor flux signal represents an optimum rotor flux signal that minimizes power losses of the AC machine.

3. The method of claim 1, wherein the second rotor flux signal is determined based on the determined power compensating and on the ripple component.

4. The method of claim 1, wherein the determined power compensating value is configured as a correction of the ripple component.

5. The method of claim 1, wherein the second rotor flux signal and an electromechanical torque signal are both provided to the power inverting unit by a field oriented control unit.

6. The method of claim 1, wherein the minimization of power losses of the AC machine translates into a minimization or optimization of an input power to the AC machine when a power output is maintained substantially constant.

7. The method of claim 6, wherein the power compensating value minimizes a phase shift between the second rotor flux and the optimized input power.

8. A computing system, comprising:
    one or more computers and one or more storage devices storing instructions that are operable, when executed by the one or more computers, to cause the one or more computers to perform a method for minimizing power losses in an alternating current (AC) machine, comprising:
    determining a first rotor flux signal based on voltage and current input signals to the AC machine;
    determining a ripple component of the first rotor flux signal;
    determining a power compensating value that corresponds to a stored energy value of the AC machine based on the ripple component;
    determining a second rotor flux signal based on the determined power compensating value, wherein the second rotor flux signal serves to minimize power losses of the AC machine; and
    providing the second rotor flux signal to a power inverting unit configured to adjust the voltage and current input signals provided to the AC machine.

9. The computing system of claim 8, wherein the second rotor flux signal represents an optimum rotor flux signal that minimizes power losses of the AC machine.

10. The computing system of claim 8, wherein the second rotor flux signal is determined based on the determined power compensating and on the ripple component.

11. The computing system of claim 8, wherein the determined power compensating value is configured as a correction of the ripple component.

12. The computing system of claim 8, wherein the second rotor flux signal and an electromechanical torque signal are both provided to the power inverting unit by a field oriented control unit.

13. The computing system of claim 8, wherein the minimization of power losses of the AC machine translates into a minimization or optimization of an input power to the AC machine when a power output is maintained substantially constant.

14. The computing system of claim 13, wherein the power compensating value minimizes a phase shift between the second rotor flux and the optimized input power.

15. A system for minimizing power losses in an alternating current (AC) machine, comprising:
    a rotor-flux estimating unit configured to derive a first rotor flux signal based on signals of voltage and current inputs to the AC machine;
    a ripple extracting unit for extracting a ripple component of the first rotor flux signal;
    a power compensating unit for determining a power compensating value that corresponds to a stored energy value of the AC machine based on the extracted ripple component;
    a ripple correlation unit for determining a second rotor flux signal based on the determined power compensating value, wherein the second rotor flux signal serves to minimize power losses of the AC machine; and
    a power inverting unit configured to adjust the voltage and current input signals provided to the AC machine based on the second rotor flux signal.

16. The system of claim 15, further comprising:
    a field oriented control unit for providing both the second rotor flux signal and an electromechanical torque signal to the power inverting unit.

17. The system of claim 15, wherein the second rotor flux signal represents an optimum rotor flux signal that minimizes power losses of the AC machine.

18. The system of claim 15, wherein the second rotor flux signal is determined based on the determined power compensating and on the ripple component.

19. The system of claim 15, wherein the determined power compensating value is configured as a correction of the ripple component.

20. The system of claim 15, wherein the minimization of power losses of the AC machine translates into a minimization or optimization of an input power to the AC machine when a constant power output is maintained substantially constant.

21. The system of claim 20, wherein the power compensating value minimizes a phase shift between the second rotor flux and the optimized input power.

* * * * *